United States Patent Office 2,797,937
Patented July 2, 1957

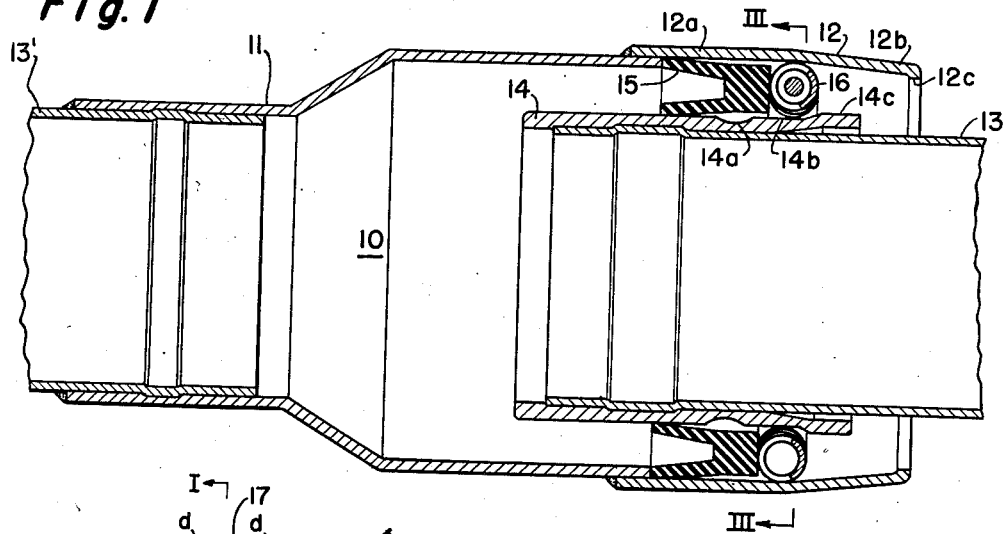
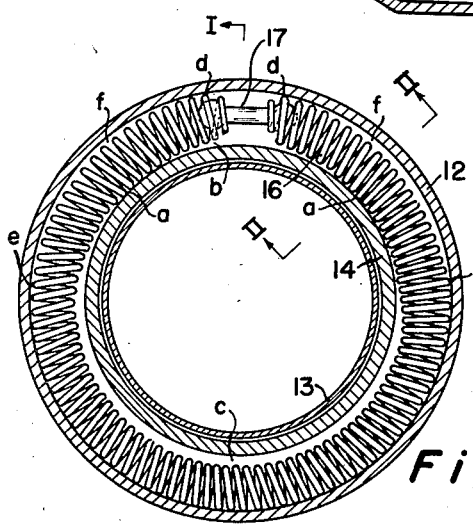
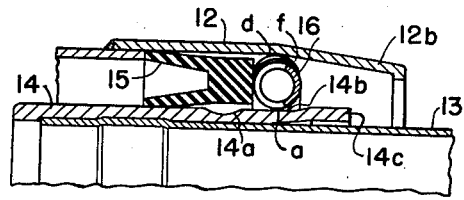
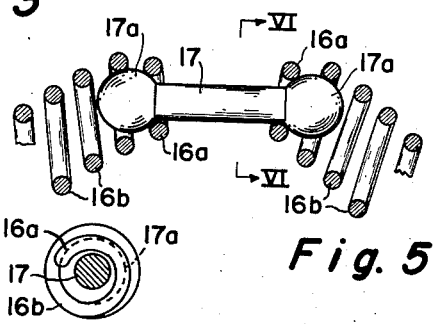
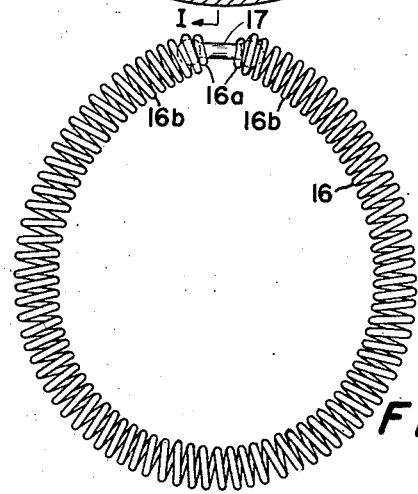

2,797,937

PRESSURE RESPONSIVE GRIP COUPLING

Henry Frishof, Pittsburgh, Pa., assignor to McDowell Manufacturing Company, Pittsburgh, Pa., a corporation of Pennsylvania Application November 28, 1955, Serial No. 549,316

5 Claims. (Cl. 285—105)

This invention relates to a coupling construction and particularly, to one of the general type disclosed in the Wallace Patent No. 2,709,092 and the Beyer et al. Patent No. 2,259,453.

A coupling of the type here involved makes use of a coupling or housing body member having a tapered or cone-shaped throat and a flexible, spring-like grip or latch element that is constructed to operate between opposed operating surfaces, one of which is defined by such throat and the other of which is defined by a nose end part or outer surface portion of a pipe or conduit member to be held in position. To make a coupling of this type effective for use with fluid-carrying members, a resilient gasket having a pressure heel is employed; this gasket is constructed to, under an application of fluid pressure, force the grip element towards a converging end of the operating spacing and into locking or gripping engagement between the throat and the conduit member with a force proportioned to fluid pressure.

In employing a coupling of this type, the Beyer et al. patent provides the grip element with an inner diameter substantially corresponding to the outer diameter of the operating surface provided by the nose end portion on the outer surface of the conduit member, so that a gripping action will be provided at all times and irrespective of whether or not fluid pressure is being applied. Although an initial gripping action may be desirable, it then becomes more difficult to assemble and separate the members; thus, to withdraw the conduit member from within the coupling body, a combined relative axial pulling and turning action has been required. This arrangement also involves a rather accurate hand setting of the coupling parts, and factors of spring-size, wire guage, and the amount of spring flexibility become more important.

On the other hand, a coupling is disclosed in the Wallace patent whose grip element has an inner diameter that is normally or is shaped larger than the outer diameter of the operating surface defined by the nose or end portion of the conduit member. This makes possible a simple endwise or axial push-in or pull-out of the nose end portion. However, in this arrangement, no initial holding or gripping action is provided until the grip element is advanced, as by fluid pressure, along the throat with gripping engagement between opposed operating surfaces that are provided by the coupling body and the conduit member or its nose portion. This arrangement simplifies manufacturing operations as well as the assembly and disassembly of the members, but does not provide an initial or off-fluid-pressure holding action that is desirable and in some cases, is necessary.

There has thus been a need for a coupling arrangement which will, in effect, combine the advantageous features of the above-described so-called tight and loose-fitting types as above described, but which will at the same time at least minimize the disadvantageous features of each of them.

It has thus been an object of my invention to provide a solution to the problem thus presented in the form of an improved coupling construction;

Another object has been to devise a coupling arrangement having an immediate gripping action, but which may be more readily assembled and disassembled when fluid pressure has been relieved;

A further object of my invention has been to devise a new principle of gripping action, as accomplished by a grip annulus or element between opposed operating surface members, which is effective irrespective of whether or not fluid pressure has been applied, and whether or not the grip element has been advanced along the converging spacing between the members to a tight gripping engagement between their operating surface portions and along the extent of its inner and outer peripheries;

A still further object of my invention has been to devise a new and improved form of grip annulus or element for use in a coupling construction;

These and many other objects of my invention will appear to those skilled in the art from the description and the exemplary embodiment illustrated in the drawings.

In the drawings,

Figure 1 is a longitudinal side section in elevation along the line I—I of Figure 3 and showing a coupling unit employed in accordance with my invention; this figure illustrates an initial relationship between the members to be joined, such as may occur when a conduit or pipe member has been initially pushed into position within a housing or body member or when a flexible grip element has been released from an application of positive fluid pressure;

Figure 2 is a fragmental detail in side elevation on the same scale as Figure 1 and taken along the line II—II of Figure 3, showing how the parts effect a positive gripping relationship without the application of positive fluid pressure within the members;

Figure 3 is an end or transverse section in elevation on the same scale as and taken along the line III—III of Figure 1; it particularly illustrates an initial operative positioning of a grip element part in the operative spacing between opposed operating surface portions;

Figure 4 is an end view of the grip element part on the scale of Figures 1 to 3, showing its elongated shape when it is free and how its end portions are retained in an outer spaced relation;

Figure 5 is an enlarged fragmental section of connected end portions of the grip element construction of Figures 3 and 4; and Figure 6 is a cross section on the scale of Figure 5 and taken along the line VI—VI of such figure.

In carrying out my invention, instead of employing a fully circular grip annulus, coil or element 16, I utilize one whose end portions 16b are held in an operating relationship with each other, but for relative movement with respect to each other along the longitudinal axis defined by inner and outer peripheral portions of the grip annulus 16. That is, ends 16a of the coil are no longer connected to provide a continuous circular ring, but are held in position and connected together as a joint for somewhat free movement on a keeper or link element 17. The spring-like grip coil or element 16 may be constructed with the same clearance factors as the one employed in the Wallace construction, so that when its ends are held together, as by the full application of fluid pressure, it will have a substantially circular shape and its inner and outer peripheries, will like the coil in the Wallace patent, be in substantially full contact with the opposed operating surfaces. However, unlike the Wallace coil, it will in its initial position have staggered-spaced portions along its inner and outer peripheries or diameters that are in gripping engagement between operating surfaces of the housing body and conduit members.

As illustrated in Figures 3 and 4, the employment of a linkage 17, such as particularly shown in Figure 5 of the drawings, provides a grip coil or spring-like element 16 that is normally of a somewhat elongated shape, such that in its initial position and, at all times, portions of its convolutions are always in contact with opposed operating surface portions that define a converging spacing between a coupling housing body or member and a conduit end or nose portion.

As a result, an engaging relationship is attained which positively prevents the coupling members from falling, sliding, or being pulled out of an assembled or joined relationship with each other, unless such a separation is desired. That is, if attempts are made to remove conduit or tube end 13 by a straight pull, the joint is locked by reason of the free action of the ends of the grip annulus. Under the action of fluid pressure, the annulus 16 operates in the same manner as a continuous grip element in advancing, expanding and contracting along the opposed operating surface portions, and of course, at such time attains a full substantially circular shape.

In Figure 1 of the drawings, I have shown coupling members in an initially assembled or pushed-in relationship with respect to each other. This represents the relationship before fluid pressure is applied or which may exist after fluid pressure has been relieved and the grip element 16, by reason of its spring action, has returned to an initial position.

Coupling assembly 10 is utilized to removably join or connect a pair of pipe, tubing or conduit members 13 and 13' which may be of the same diameter. A coupling housing body is made up of a connecting part 11 which at one end thereof has a telescopic and interlocking fit with the pipe member 13' and which at its other end has an outwardly-offset cylindrical or annular body to which is secured a forward or throat part 12. It will be noted that the parts 11 and 12 as well as a nose part 14 are of thickened or strengthened construction as utilized with relatively thin-wall tubing or pipe members 13 and 13'.

The throat part 12 has a cylindrical back end or sleeve portion 12a and a connected and integral, outwardly-converging or tapered cone-shaped portion 12b. The tapered portion 12b terminates in an inwardly-depending safety edge or flange 12c to aid in retaining a grip assembly 15—16 in position.

An annular fluid-pressure-sensitive gasket 15 is, as shown, operatively positioned with its outer feather edge in abutment with an inner end of the part 11 and to rest within the annular or cylindrical portion 12a of the part 12. The gasket 15, of rubber-like or resilient material, has a pressure heel which, as shown, is adapted to be positioned in an operative relation or abutment with the grip element, annulus or coil member 16. The grip element 16 is made up of a plurality of continuous, spring-like, and normally spaced-apart convolutions (see Figures 3 and 4) and is adapted to rest in the operative spacing defined by the opposed members 12 and 14. The grip element 16 is adapted to be advanced under fluid pressure forwardly along the throat portion 12b towards the converging end of the operating spacing when fluid under pressure is introduced within the chamber portion of the gasket 15. It will be noted that chamber is defined by inner and outer peripheral feather edges of the gasket 15.

The other conduit member 13 is shown provided with a wearing, reinforcing, and operating-surface-providing nose part or member 14 in a telescopic and securely mounted relationship on its end portion. The nose part 14 may, as shown particularly in Figures 1 and 2, have a safety groove 14a, such as described in the Wallace patent, a cylindrical or annular operating surface 14b, and an outer limiting and radially-outwardly projecting banding rim or limit shoulder portion 14c. The portion 14c serves to define an outwardly-offset, operating limit-stop for the grip element or member 16 on the nose part and to provide an insertion limit-stop for the end portion of the member 13.

As shown particularly in Figures 3 to 6, inclusive, the grip element or member 16 at its ends has convolutions 16a that are crimped or of reduced diameter and that define a socket to receive or fit over a rounded or somewhat spherical, enlarged, end portion 17a of the keeper or connecting link member or element 17. The convolutions along the remainder of the length of the element 16 are of substantially equal extent and of like contour, being joined together to define strut portions and being continuous, except at the ends to which the link element 17 is attached.

Although the link 17 may be given a curvature, I have found that this is disadvantageous and that a straight construction such as shown will permit the ends 16a to better and surely move relatively to each other and into engagement when full fluid pressure has been applied. The member or element 17 thus serves to retain the end portions 16b in a proper working position, even although the coupling may be jarred by dropping the assembly.

As shown in Figure 3, the grip element or coil 16, in its initial, assembled or off-fluid-pressure position between the operating surfaces of the parts 12 and 14, has a pair of offset or length portions along its inner diameter that are in engagement or contact at a with the nose part 14. As to the nose part 14, the coil 16 also has an inner spaced relationship b at its ends and along the major extent of its annular or axial length, see c. Along its outer diameter or circumference, the major extent of the coil 16 is shown in engagement with the throat 12, see e; and it has an intermediate short-length spacing f substantially opposed to the inner contacting surface at a, and an end engagement at d substantially opposed to the spacing b. Among other things, this construction eliminates the necessity for a hand fitting of the grip element to give an interference fit.

It will be noted that for simplicity of illustration, I have shown normal relationships between housing body member or throat 12, tubing end or nose part 14, and grip coil or annulus 16. Such relations occur when, for example, the conduit member 13 and the housing body 12 rest on a suitable support (such as the surface of the ground) in a substantially aligned relationship with each other. If for any reason, the member 13 is allowed to sag (by reason of gravity pull) downwardly with respect to body 12, it is apparent that the coil gripping action a (see Figure 3) is not only maintained, but is increased, even though the spacing c of this figure may be closed or eliminated. If there is a tendency for relative movement or sag by reason of a weight-induced give-way of the ground, then the housing body 12, by reason of its great weight, will tend to sag with respect to the conduit 13 and not vice versa. Normally, sag does not occur at the moment of pull-out, in that it is customary to support the conduit 13 while it is being removed from within the housing body 12.

The new arrangement gives an automatic interference with a wide leeway as to clearance or fit and provides a much easier assembling and disassembling, in that the members may be separated by pulling 13 outwardly with respect to 13' with a slight turning or oscillating action, as distinguished from the heavy pull and continuous turning action of the Beyer et al. type and the straight pull-out action of the Wallace type.

In my present construction, there are two localized or limited areas or points of holding engagement a that are made by the convolutions of grip element 16 along its inner periphery with operating surface provided by the conduit end portion of its nose part 14. I have found that such a limited area or extent is highly important in obtaining an ease of removal while, at the same time, positively preventing an unauthorized or undesired slide or pull-out or separation.

The link element or keeper 17 keeps the grip element 16 from being jarred-out of position, holds it in substantial axial alignment, and in a proper operating relationship at all times within the operating spacing between the members or parts 12 and 14. Although metal spring wire is ordinarily employed for the elements 16, I have found that flexible plastic may also be used. The straight shape of the element 17 makes it immaterial whether or not it turns on its seats or sockets within the crimped portions 16a, as the element 17 cannot present a reverse curve and there is plenty of clearance to permit the ends 16a to slide along the full extent of the link 17.

In arriving at the form of grip element, as disclosed and described herein, I attempted to obtain desired results by taking a standard, end-connected, circular or substantially fully continuous type of coil, such as disclosed in the Wallace patent, and then bending it to provide at least two offset apices. I found that such an arrangement was not satisfactory and that arrangements employing one or a plurality of such offsets or bends in an annular spring or grip element were also unsatisfactory. In fact, distorting a continuous grip element not only interferes with its normal fluid-sensitive gripping and releasing action, but also tended to jam the assembly, so that the members may not be separated, even in a manner contemplated by the Beyer et al. patent.

I also experimented with a coil having more than one pair of linkage-connected or separated ends, such as 16a. Such an arrangement was found to be unsatisfactory from the standpoint of the desired fluid-pressure sensitive operation. In effect, two separate halves of the coil were provided which tended to operate independently of each other and not as an effective gripping unit.

In accordance with my invention, I provide a grip coil 16 which is a continuous unit, except for an opposed pair of its ends, and these ends are joined by a slidably-operative, connecting linkage. The element 16, when in its initial or fluid-pressure-released operating position, does not contact the full extent of the opposed annular operative surfaces, but has a limited extent or area of contact initially and at all times such that its loose end portions will move back with the tube end and along the taper of the coupling throat to lock the joint if an attempt is made to pull the conduit member 13 outwardly from the housing body or member 11. The limited contact, however, permits a disassembly of the joint by a simple or easy slide-turning motion on the tube or conduit end portion.

What I claim is:

1. In a coupling for holding a member in position with respect to a housing body wherein, the housing body and the member have opposed operating surfaces defining a converging spacing towards one end of the housing body, a grip coil of flexible spring-like construction having a connected series of spaced convolutions, a link operatively connecting adjacent end portions of said coil for relative movement with respect to each other along a periphery of said coil to define a substantially circular shape of coil when in close adjacency and an elongated shape of coil when in a spaced relationship with each other, said coil when in an initial uncompressed position within a diverging end of the spacing, having an elongated annular shape with portions of limited extent along its inner periphery engaging the operating surface of the member to hold it in position with respect thereto, having an outer periphery approximating the periphery of the operating surface of the housing body, and having an inner periphery larger than the periphery of the operating surface of the member.

2. In a coupling device for holding a member in position with respect to a housing body wherein, the housing body and the member have opposed operating surfaces defining a converging spacing towards one end of the housing, a flexible grip coil annulus adapted to be operatively positioned about the member and within the housing between the opposed operating surfaces for movement towards the converging spacing, a fluid-pressure-sensitive resilient gasket operatively positioned within the converging spacing in operative relationship with said coil annulus to advance it towards the converging spacing upon an application of positive fluid pressure, said annulus having normally spaced-apart convolutions provided with a joint defined by adjacent end portions, a link operatively connecting said end portions for movement from a spaced relation to close adjacency with each other, said annulus having an inner gripping periphery when its ends are in a close adjacency that is substantially circular, said annulus when in an initial uncompressed position within a diverging end of the spacing, having an elongated annular shape with portions of limited extent along its inner periphery engaging the operating surface of the member to hold it in position with respect thereto, having an outer periphery approximating the periphery of the operating surface of the housing body, and having an inner periphery larger than the periphery of the operating surface of the member and all in such a manner as to hold the member in position with respect to the housing body before fluid pressure has been exerted upon said gasket and after fluid pressure has been released.

3. In a coupling construction having a pair of annular members to be connected together, one member of which is to be positioned as a housing in a spaced relationship about the other member, the pair of members having opposed operating surfaces defining a converging annular operating spacing towards one end of the coupling, a spring-like elongated grip coil operatively positioned for movement towards the converging spacing into gripping engagement along its inner and outer peripheries with respect to the opposed operating surfaces, said coil having a series of spaced-apart convolutions, means loosely-connecting ends of said coil together, said ends being movable relative to each other on said means to compress and expand said coil within the operating spacing; said coil when positioned in a diverging end of the spacing having a continuous elongated shape, having an inner periphery that is larger than the periphery of the operating surface of the other member, and having an outer periphery that approximates the periphery of the operating surface of the one member; and said coil when in its elongated shape having a portion of limited extent along its inner periphery engaging the operating surface of the other member to hold the members in position with respect to each other.

4. A coupling as defined in claim 3 wherein, said link means is of straight-line elongated shape and has ball-shaped end portions, and said coil has socket portions at its ends secured over said ball-shaped end portions for relative movement along the link towards and away from each other.

5. In a coupling having a pair of annular members to be connected together, one member of which is to be positioned as a housing body in a spaced relation about the other member, the pair of members having opposed operating surfaces defining a converging annular operating spacing towards one end of the coupling, a spring-like grip annulus to be operatively positioned about the other member and between the opposed operating surfaces for movement towards the converging spacing, said annulus having a connected series of normally spaced-apart convolutions defining peripheral gripping portions therealong, a link loosely connected between adjacent end portions of said annulus to provide for relative movement between said end portions, said annulus when in a substantially uncompressed initial position within the operating spacing having an elongated annular shape, having an inner periphery larger than the periphery of the operating surface of the other member, and having an outer periphery approximating the periphery of the operating surface of the one member; and said annulus when in such initial position having a portion of limited extent for engaging the operating surface of the other member to hold it in position with respect to the one member.

References Cited in the file of this patent

UNITED STATES PATENTS

| | | |
|---|---|---|
| 1,371,513 | Nickerson | Mar. 15, 1921 |
| 1,601,605 | Talbert | Sept. 28, 1926 |
| 2,087,479 | Quisling | Nov. 16, 1935 |
| 2,184,376 | Beyer et al. | June 10, 1937 |

FOREIGN PATENTS

| | | |
|---|---|---|
| 43,678 | Switzerland | June 9, 1908 |